United States Patent [19]

Takikawa et al.

[11] Patent Number: 4,919,247

[45] Date of Patent: * Apr. 24, 1990

[54] THERMOSENSITIVE FLUIDIZED FAN COUPLING DEVICE

[75] Inventors: Kazunori Takikawa, Sanmaibashi; Yuichi Ono, Numazu, both of Japan

[73] Assignee: Usui Kokusai Sangyo Kaisha Ltd., Shizuoka, Japan

[*] Notice: The portion of the term of this patent subsequent to Jan. 10, 2006 has been disclaimed.

[21] Appl. No.: 275,766

[22] Filed: Nov. 23, 1988

[30] Foreign Application Priority Data

Dec. 1, 1987 [JP] Japan ................... 62-303656

[51] Int. Cl.$^5$ .......................................... F16D 31/00
[52] U.S. Cl. ................................ 192/58 B; 192/82 T
[58] Field of Search ............... 192/58 B, 82 T, 103 R; 123/41.12

[56] References Cited

U.S. PATENT DOCUMENTS

| | | | |
|---|---|---|---|
| 2,879,755 | 3/1959 | Weir | 192/58 B |
| 2,988,188 | 6/1961 | Tauschek | 192/82 T X |
| 3,059,745 | 10/1962 | Tauschek | 192/82 T X |
| 3,217,849 | 11/1965 | Weir | 192/82 T X |
| 3,259,221 | 7/1966 | Godfrey | 192/82 T X |
| 3,272,188 | 9/1966 | Sabat | 192/58 B X |
| 3,430,743 | 3/1969 | Fujita et al. | 192/58 B X |
| 3,463,282 | 8/1969 | Fujita et al. | 192/58 B X |
| 3,727,735 | 4/1973 | La Flame | 192/58 B |
| 3,840,101 | 10/1974 | Peter et al. | 192/58 B |
| 3,856,122 | 12/1974 | Leichliter | 192/58 B |
| 3,964,582 | 6/1976 | Mitchell | 192/58 B |
| 4,238,016 | 12/1980 | Yoshida et al. | 192/58 B |
| 4,281,750 | 8/1981 | Clancey | 192/58 B |
| 4,403,684 | 9/1983 | Haeck | 192/58 B |
| 4,437,554 | 3/1984 | Haeck | 192/58 B |
| 4,485,902 | 12/1984 | Storz | 192/58 B |
| 4,505,367 | 3/1985 | Martin | 192/58 B |
| 4,629,046 | 12/1986 | Martin | 192/58 B |
| 4,665,694 | 5/1987 | Brunken | 192/58 B X |
| 4,667,791 | 5/1987 | Martin et al. | 192/58 B |
| 4,685,549 | 8/1987 | Brunken et al. | 192/58 B |
| 4,699,258 | 10/1987 | Johnston et al. | 192/58 B |
| 4,796,571 | 1/1989 | Ono et al. | 192/58 B |

FOREIGN PATENT DOCUMENTS

| | | |
|---|---|---|
| 55-76226 | 6/1980 | Japan . |
| 57-167533 | 10/1982 | Japan . |
| 57-179431 | 11/1982 | Japan . |
| 62-124330 | 6/1987 | Japan . |

Primary Examiner—Randolph A. Reese
Assistant Examiner—Franco S. DeLiguori
Attorney, Agent, or Firm—Anthony J. Casella; Gerald E. Hespos

[57] ABSTRACT

A fluidized fan coupling device is provided to substantially eliminate accompanying rotation followed engine start up. The device includes a sealed housing with a partition plate dividing the interior of the housing into a torque transfer chamber and an oil reservoir. The housing is rotatably mounted to a shaft which extends into the torque transfer chamber. A driving disk is mounted to the shaft and is disposed in the torque transfer chamber. An oil outflow regulating hole extends through the partition plate and is provided with a valve that responds to changes in temperature. The partition plate also has an oil circulating aperture to permit flow of oil from the torque transfer chamber to the oil reservoir only when the engine is stopped. An idle oil groove in the outer periphery of the torque transfer chamber communicates with an oil circulation passage which extends from the idle oil groove to the oil reservoir. A dam is provided in the idle oil groove to urge the oil through the oil circulation passage. Thus, a portion of the oil accumulated in the torque transfer chamber flows through the oil circulating aperture after the engine has stopped. Any remaining oil is accumulated in the idle oil groove and is urged by the dam through the oil circulating passage immediately after engine start up to substantially eliminate accompanying rotation.

6 Claims, 6 Drawing Sheets

THERMOSENSITIVE FLUIDIZED FAN COUPLING DEVICE

BACKGROUND OF THE INVENTION

1. Field of the Invention

The present invention relates to an improvement of thermosensitive fluidized fan coupling device for controlling rotations of an engine cooling fan generally in automobiles, thereby feeding a blast according to a running state to an engine all the time.

2. Description of the Prior Art

As exemplified in FIG. 5, a prior art fan coupling device of this kind comprises partitioning the interior of a sealed housing consisting of a cover (23') and a case (23") into an oil reservoir (25) and a torque transfer chamber (26) in which a driving disk (22) is installed by a divider (24) having an outflow regulating hole (24'), providing a circulation passage (27) ranging to a pumping function part by a dam (28) which is through from the torque transfer chamber (26) side to the oil reservoir (25) side, providing further an outlet (27") side on a nose opening of an almost semicircular groove (29) ranging to the circulation passage (27) provided around an inner peripheral wall surface of the oil reservoir (25) with a dissepiment held thereon so as to position at least one of an inlet (27') on the circulation passage side and the outlet (27") on an oil level present within the oil reservoir (25) regardless of the state in rotation or stopping.

However, while intended satisfactorily for preventing oil in the reservoir from accumulating in the torque transfer chamber through natural counterflow from the passage to the torque transfer chamber (26) side during a stop with the circulation passage (27) side coming below the oil level within the oil reservoir (25), preventing an abnormal fan noise from arising through checking a sudden rise of the fan rotation immediately after an engine, start-up, and for effecting a warm-up in cold season, the prior art fan coupling device has a problem inherent still therein such that the oil in the reservoir flows out of the regulating hold (24') naturally to accumulate much to the torque transfer chamber (26) side during shutdown of the engine with the overflow regulating hole side coming under the oil level of the oil reservoir (25) under the state of valve member opening the outflow regulating hole (24') of the divider (24) in a high-temperature operating state. Accordingly, after the engine is restarted, a rotational frequency of a driven side fan becomes high, as shown in formance curve B of FIG. 6, with the lapse of time, thus causing an accompanying rotation.

SUMMARY OF THE INVENTION

An object of the invention is to provide a thermosensitive fluidized fan coupling device wherein "accompanying rotation" to the driven side is retained within the period of time as short as possible immediately after the engine start-up even in case the engine stops in the high-temperature operating state, thus preventing an abnormal fan noise. Moreover, a pumping function of oil to the circulation passage from an outer periphery side of the torque transfer chamber can be secured.

The fan coupling device includes a sealed housing borne on a rotating shaft through a bearing. The housing consists of a case with a cooling fan mounted on the outer periphery and with a cover. The housing is partitioned into an oil reservoir and a torque transfer chamber by a divider having an oil outflow regulating hole extending therethrough. A driving disk fixed on the nose of the shaft is disposed in the torque transfer chamber. A dam is provided between an outer peripheral wall portion of the driving disk and an inner peripheral wall of the sealed housing opposite thereto so as to allow an oil into a circulation passage which extends through from the torque transfer chamber side to the oil reservoir side. A valve member for operating the outflow regulating hole of the divider when ambient temperature exceeds a set point and closing at the set point or below is provided internally so as to interlock with a deformation according to the temperature change of a thermosensitive member provided on a front of the aforementioned cover. A torque transfer from the rotating shaft side to the sealed housing side on a driven side is controlled by adjusting an effective contact surface of the oil in a torque transfer gap portion provided on an opposite wall surface in the outward neighborhood of the driving disk and the case and cover. The invention provides an improvement wherein the opposite peripheral surface of an outer peripheral wall portion of the driving disk and an inner peripheral wall surface on the sealed housing side is formed as an annular idle oil groove provided apart along the peripheral surface. The dam is constituted of a master dam and a subsidiary dam. The master dam is provided on the idle oil groove near an inlet of the circulation passage and apart somewhat from the outer peripheral wall portion of the driving disk. The subsidiary dam is provided at the gap projecting from the master dam and sliding with the outer peripheral wall portion of the driving disk. An oil circulating means for allowing the oil reservoir and the torque transfer chamber to communicate with each other only at the time of stopping is provided near the central portion of the divider.

According to the invention, a structure of the thermosensitive fluidized fan coupling device comprising the oil circulating means and the idle oil groove formed between opposite peripheral surfaces in the torque transfer chamber is effective in discharging an oil in the torque transfer chamber toward the idle oil groove immediatly after restart-up of an engine, thus keeping the torque transfer chamber almost vacant of the oil interiorly. Therefore, the "accompanying rotation" on a driven side can be prevented effectively. At the time of restart-up of the engine after stopping in a high-temperature operating state, a sudden rise of the fan rotation is checked to prevent an abnormal fan noise and accelerate a warm-up, and the "accompanying rotation" can be prevented further effectively. Moreover, the oil flowing along an outer peripheral side of the driving disk can be delivered securely to the circulation passage side by the dam provided in the idle oil groove according to a rotation of the driving disk in the ensuing operation state, thereby controlling the fan rotation according to a change in ambient temperature.

DETAILED DESCRIPTION OF PREFERRED EMBODIMENTS

Figure 1:
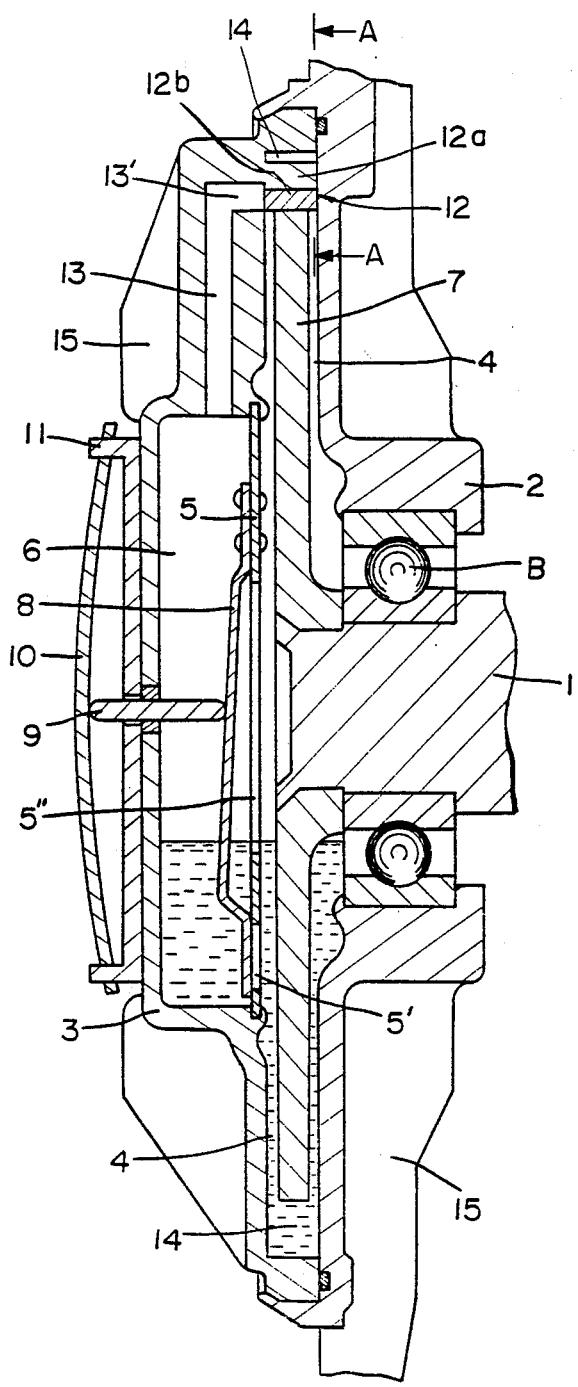
FIG. 1 is a longitudinal cross-sectional view showing accumulating state of an oil at the time of stopping of a thermosensitive fluidized fan coupling device given in one embodiment of the invention.
Figure 2:
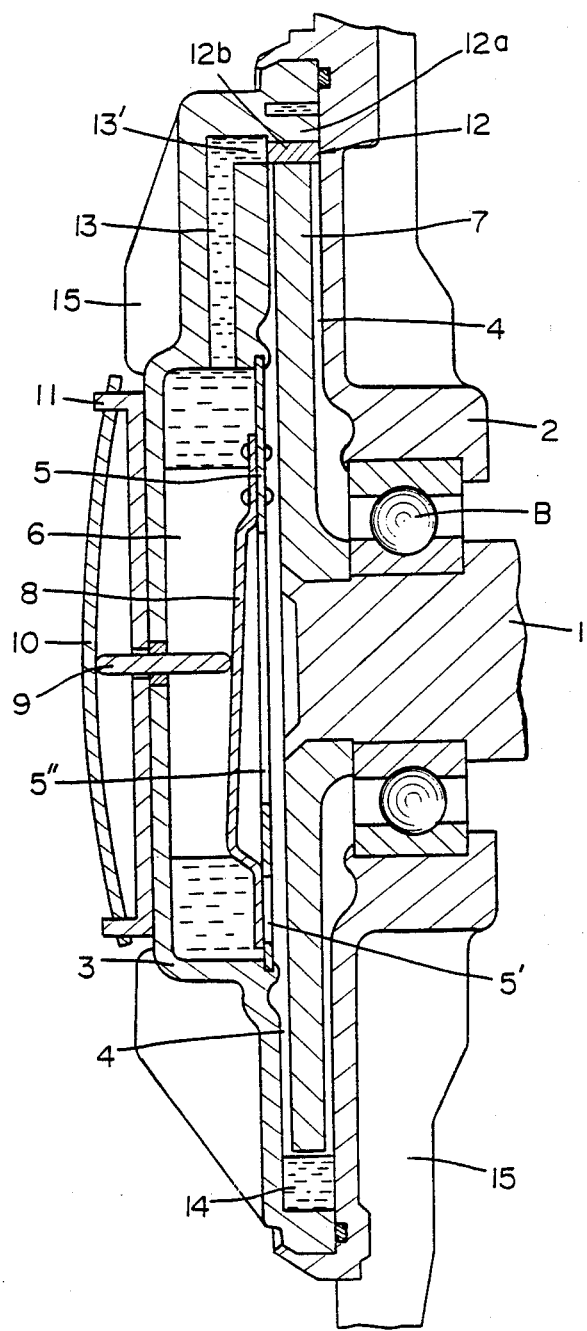
FIG. 2 is an explanatory drawing showing accumulating state of the oil of FIG. 1 at the time of low-temperature operation.
Figure 3:
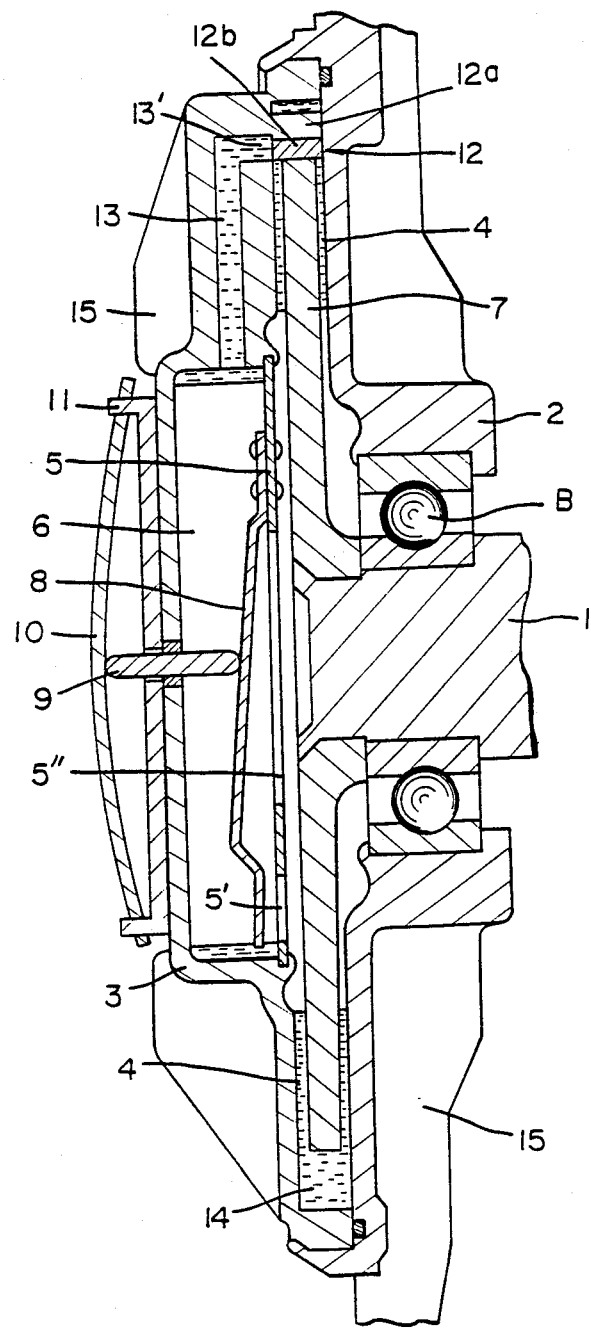
FIG. 3 is an explanatory drawing showing accumulating state of the oil of FIG. 1 likewise at the time of high-temperature operation.
Figure 4:
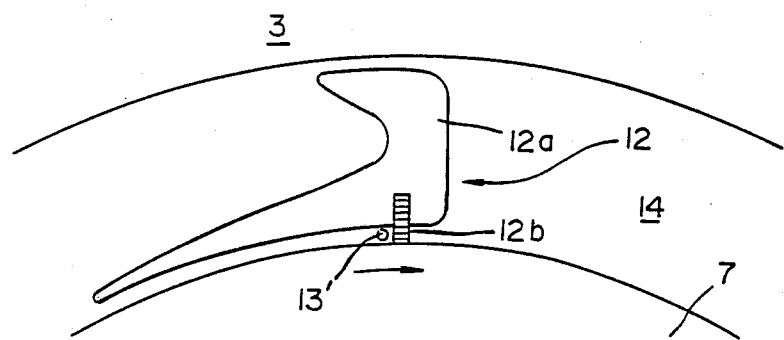
FIG. 4 is a fragmentary enlarged cross-sectional view taken on line A—A of FIG. 1.
Figure 5:
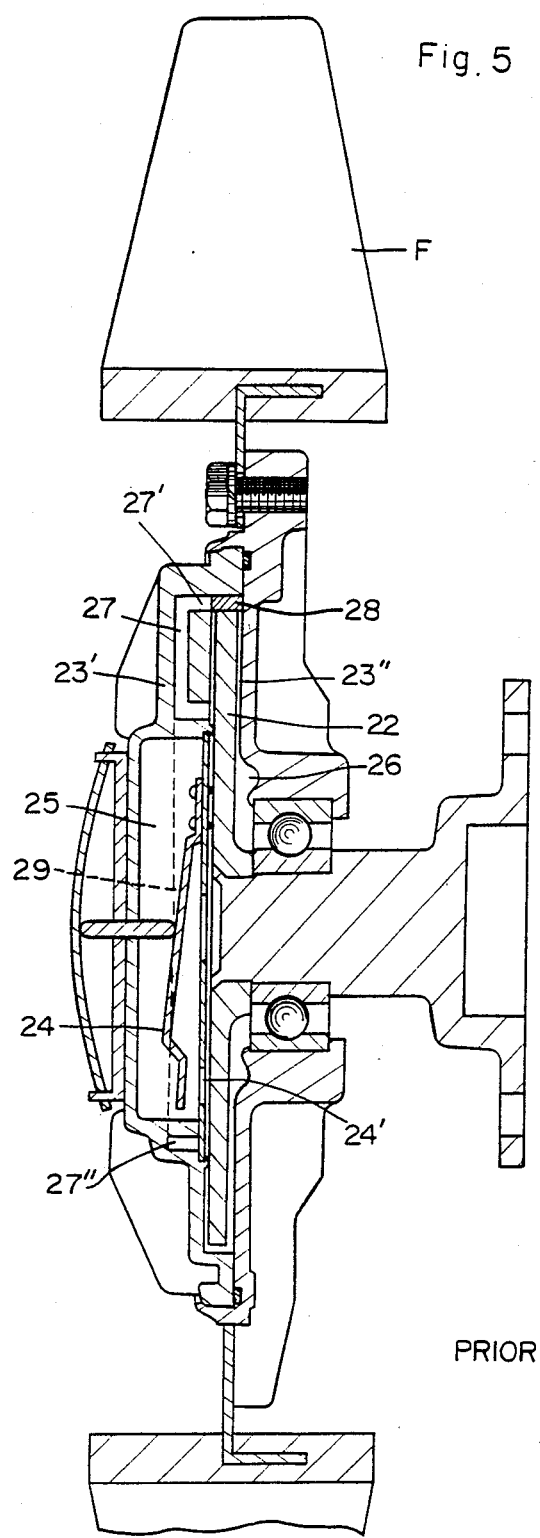
FIG. 5 is a longitudinal cross-sectional view exemplifying a prior art fan coupling device.

In FIG. 1 to FIG. 4, (1) denotes a rotating shaft with a driving disk (7) fixed on the nose and a mounting flange wall (not indicated) to another construction element provided on the rear end portion, whereon borne through a bearing (B) is a sealed housing consisting of a case (2) with a cooling fan (not indicated) mounted on the outer periphery and a cover (3). A reference numeral (5) denotes a divider partitioning the interior of the sealed housing into an oil reservoir (6) and a torque transfer chamber (4) in which the driving disk (7) is installed, and an outflow regulating hole (5') of oil from the oil reservoir (6) to the torque transfer chamber (4) is provided on the divider. The driving disk (7) comprises retaining a minute gap for torque transfer with an opposite wall surface in the outward neighborhood of the sealed housing including the divider (5) within the torque transfer chamber (4). A reference numeral (8) denotes a valve member for operating the outflow regulating hole (5') with its one end riveted on a wall surface of the divider (5) on the oil reservoir (6) side and the outer end provided on the outflow regulating hole portion, which is provided internally so as to interlock, through a coupling rod (9), with a deformation according to ambient temperature change of a thermosensitive member (10) consisting of a platelike bimetal with its opposite ends engaged with a support fitting (11) locked on a front of the cover (3). Then, instead of the platelike bimetal, a spiral bimetal may be used for turning the valve member (8) to slide on the surface of the divider (5), thereby operating the outflow regulating hole (5'). A reference numeral (12) denotes a dam provided between an outer peripheral portion of the driving disk (7) and an inner peripheral wall of the sealed housing, having a pumping function to allow an oil into an inlet (13') of a circulation passage (13) which is through from the torque transfer chamber (4) side to the oil reservoir (6) side. A reference numeral (5") denotes a circular through hole provided near the central portion of the divider (5) or a plurality of small diametral through holes (not indicated) provided on the same circumference from the shaft center thereof, functioning as an oil circulating means for allowing the oil reservoir (6) and the torque transfer chamber (4) to communicate with each other only at the time of stopping.

A reference numeral (14) denotes an annular idle oil groove formed between opposite peripheral surfaces of the outer peripheral wall portion of the driving disk (7) and the inner peripheral wall surface on the sealed housing side with a sufficient interval taken therefor and the inlet (13') portion of the circulation passage (13) positioned within the interval, having a capacity which is substantially the same as the quantity of oil which accumulates in the idle oil groove (14) and the torque transfer chamber (4). A reference numeral (15) denotes a radiant cooling fin provided projectingly on an outside of the sealed housing. The dam (12) comprises an almost L-shaped master dam (12a) provided on the idle oil groove (14) near the inlet (13') of the circulation passage (13) with a gap left against an outer peripheral wall portion of the driving disk (7), a subsidiary dam (12b) consisting of, for example, fluororesin having elasticity and wear resistance, which is provided at the gap projectingly from the master dam (12a) and sliding with the outer peripheral wall portion of the driving disk (7), and the construction is such that an oil flowing along an outer peripheral side of the driving disk (7) on rotations of the driving disk (7) is checked by the dam (12) to increase a pressure on the upstream side of the dam, thereby raising pressure immediately before the inlet (13') to deliver the oil securely to the circulation passage (13) side. Then in the illustration, a slight gap is provided between an outer peripheral end wall of the master dam (12a) and an inner periphery of the idle oil groove (14), however, such gap may be omitted to blocking.

Figure 6:
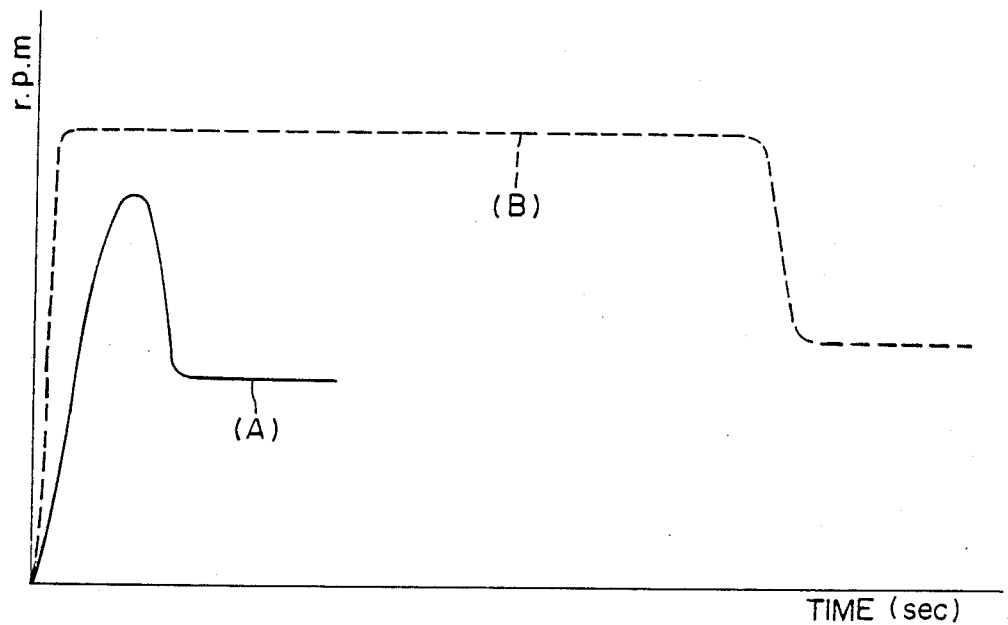
FIG. 6 is a comparative characteristic curve between the invention and the prior art.

According to the aforementioned construction of the invention, the annular idle oil groove (14) is formed between opposite peripheral surfaces of the outer peripheral wall portion of the driving disk (7) and the inner peripheral wall surface on the sealed housing. A sufficient interval is provided for the idle oil groove (14), with the inlet (13') portion of the circulation passage (13), which is disposed near to the dam (12) in the direction of rotation being positioned within the interval of the idle oil groove (14) to communicate therewith. The divider (5) is provided with the oil circulating means (5") for allowing the oil reservoir (6) and the torque transfer chamber (4) to communicate with each other for natural circulation of the oil only at the time of stopping. Thus, even at the time of stopping with the much oil accumulated in the torque transfer chamber (4) after high-temperature operation, the oil in the torque transfer chamber (4) is decreased by circulating the oil naturally from the torque transfer chamber side to the oil reservoir (6) side through the circulating means (5") of the divider (5) during stopping. Further the presence of the idle oil groove (14) is effective in discharging the oil accumulated in the torque transfer chamber (4) efficiently into the idle oil groove on a centrifugal force arising on the oil acccording to a rotation of the sealed housing side at the time of engine restart-up, and further the oil flowing along the outer peripheral side of the driving disk (7) is checked by the dam (12) consisting of the master dam (12a) provided near the inlet (13') and the subsidiary dam (12b), thus increasing the oil pressure at the inlet (13') portion higher than the oil reservoir (6) to deliver securely to the circulation passage (13) side. These states are represented as a performance characteristic curve A in FIG. 6.

What is claimed is:

1. A thermosensitive fluidized fan coupling device, comprising: a rotatable shaft, a sealed housing rotatably mounted to said shaft, said sealed housing having an interior with an inner peripheral wall surface, a divider having an oil outflow regulating hole disposed in said sealed housing and partitioning said interior of said sealed housing into an oil reservoir and a torque transfer chamber, a driving disk provided on said shaft and disposed in the torque transfer chamber, said driving disk having an outer peripheral wall portion disposed in opposition to said inner peripheral wall surface of said sealed housing, a dam provided on a part of the inner peripheral wall surface of said sealed housing opposite to said outer peripheral wall portion of said driving disk on which an oil accumulates at the time of rotation, a circulation passage extending from a portion of said torque transfer chamber near said dam to said oil reservoir, a valve member for operating the outflow regulating hole of said divider by cooperation with a thermosensitive member provided on an exterior portion of said sealed housing according to ambient temperature change, wherein a torque transfer from said rotating shaft to said sealed housing is controlled by adjusting an effective contact area of the oil at a torque transfer gap between opposite outwardly disposed portions of said driving disk and the sealed housing, the improvement characterized in that an annular idle oil groove is formed between said outer peripheral wall portion of said driving disk and said inner peripheral wall surface on said sealed housing for a selected interval along said peripheral surfaces, said dam comprising a master dam provided in said idle oil groove in proximity to said circulation passage and spaced outwardly from said outer peripheral wall portion of said driving disk and a subsidiary dam provided projectingly from said master dam into sliding relationship with said outer peripheral wall portion of the driving disk, and further comprising an oil circulating means for allowing said oil reservoir and said torque transfer chamber to communicate with each other only at the time of stopping, said oil circulating means being provided near a central portion of said divider.

2. The thermosensitive fluidized fan coupling device as defined in claim 1, wherein said master dam is formed to have a generally L-shape.

3. The thermosensitive fluidized fan coupling device as defined in claim 1, wherein said subsidiary dam is formed of an elastic and wear resisting material.

4. The thermosensitive fluidized fan coupling device as defined in claim 3, wherein said subsidiary dam consists of fluororesin.

5. The thermosensitive fluidized fan coupling device as defined as claim 1, wherein said oil circulating means is a through hole provided on the divider.

6. The thermosensitive fluidized fan coupling device as defined in claim 1, wherein said idle oil groove has a volume almost equal at least to the quantity of oil already accumulated in said torque transfer chamber and said idle oil groove at said time of stopping.

* * * * *